(12) United States Patent
Deng et al.

(10) Patent No.: US 8,948,766 B2
(45) Date of Patent: Feb. 3, 2015

(54) MEASUREMENT REPORTING METHOD FOR CLOSED SUBSCRIBER GROUP CELL AND CORRESPONDING USER EQUIPMENT

(75) Inventors: Yun Deng, Shenzhen (CN); Xiaojuan Shi, Shenzhen (CN); Yada Huang, Shenzhen (CN); Zhongming Chen, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 383 days.

(21) Appl. No.: 13/257,874

(22) PCT Filed: Jan. 22, 2010

(86) PCT No.: PCT/CN2010/070323
§ 371 (c)(1),
(2), (4) Date: Dec. 6, 2011

(87) PCT Pub. No.: WO2010/142150
PCT Pub. Date: Dec. 16, 2010

(65) Prior Publication Data
US 2012/0115459 A1    May 10, 2012

(30) Foreign Application Priority Data
Jun. 11, 2009   (CN) .......................... 2009 1 0147323

(51) Int. Cl.
*H04W 36/00* (2009.01)
*H04W 48/02* (2009.01)

(52) U.S. Cl.
CPC .......... *H04W 36/0094* (2013.01); *H04W 48/02* (2013.01)
USPC ........ 455/444; 455/421; 455/422.1; 455/434; 455/443; 455/448

(58) Field of Classification Search
USPC ........... 455/422.1, 432.1, 434, 439, 442, 444, 455/446, 447, 453; 370/329, 330, 331, 333
See application file for complete search history.

(56) References Cited

U.S. PATENT DOCUMENTS 6,556,829 B1    4/2003    Persson
7,583,966 B2 *  9/2009    Haseba et al. ................ 455/436
(Continued)

FOREIGN PATENT DOCUMENTS

CN    101128000 A    2/2008
CN    101360334 A    2/2009
(Continued)

OTHER PUBLICATIONS

Samsung, "Issues with UE autonomous search function for Home-eNB cells", 3GPP TSG-RAN WG2 Meeting #65bis, R2-092424 Mar. 19, 2009.
(Continued)

*Primary Examiner* — Dai A Phuong
(74) *Attorney, Agent, or Firm* — Oppedahl Patent Law Firm LLC

(57) ABSTRACT

A measurement reporting method for a Closed Subscriber Group (CSG) cell and a corresponding User Equipment (UE) are provided in the present invention. The method comprises the following steps that: after detecting a neighboring accessible CSG cell which is not on a frequency in a measurement configuration, a UE in a connected state requests a network for a measurement configuration by reporting indication information which contains the frequency information of the accessible CSG cell and/or the bandwidth information of the accessible CSG cell. The present invention solves the problem about the measurement and reporting of a CSG cell by a UE, so that a network is able to make a decision in time according to a measurement report, satisfying the requirement of the UE on mobility.

16 Claims, 3 Drawing Sheets

(56) References Cited

U.S. PATENT DOCUMENTS

| | | | |
|---|---|---|---|
| 2009/0239533 A1* | 9/2009 | Somasundaram et al. | 455/434 |
| 2009/0270092 A1* | 10/2009 | Buckley et al. | 455/434 |
| 2010/0113009 A1* | 5/2010 | Jeong et al. | 455/423 |
| 2010/0304748 A1* | 12/2010 | Henttonen et al. | 455/436 |
| 2011/0092214 A1* | 4/2011 | Iwamura | 455/438 |
| 2011/0149903 A1* | 6/2011 | Krishnamurthy et al. | 370/330 |
| 2012/0015681 A1* | 1/2012 | Dalsgaard et al. | 455/517 |
| 2014/0094173 A1* | 4/2014 | Deshpande et al. | 455/435.2 |

FOREIGN PATENT DOCUMENTS

| | | |
|---|---|---|
| CN | 101370226 A | 2/2009 |
| CN | 101867966 A | 10/2010 |
| JP | 2009124671 A | 6/2009 |
| WO | 2007089128 A1 | 8/2007 |

OTHER PUBLICATIONS

Nokia Corporation et al., "Measurement Configuration and Reporting for CSG cells", 3GPP TSG-RAN WG2 Meeting #65bis, R2-092412 Mar. 17, 2009.

Ericsson, "Active mode inbound mobility to CSG", 3GPP TSG-RAN WG2 Meeting #65bis, R2-092084 Mar. 17, 2009.

International Search Report in international application No. PCT/CN2010/070323, mailed on Apr. 29, 2010.

English Translation of the Written Opinion of the International Search Authority in international application No. PCT/CN2010/070323, mailed on Apr. 29, 2010.

Supporting Inbound Mobility from GERAN to CSG in Dedicated / Packet Transfer Mode, Feb. 20, 2009.

3GPP TS 36.300 V8.6.0, Release 8, Changes to TS36.300 agreed in RAN3#61bis and RAN3#62, R2-087450 [p. 68] Sep. 2008.

* cited by examiner

MEASUREMENT REPORTING METHOD FOR CLOSED SUBSCRIBER GROUP CELL AND CORRESPONDING USER EQUIPMENT

TECHNICAL FIELD

The present invention relates to the measurement and reporting of a neighboring cell by a User Equipment (UE) in the field of mobile communications, and particularly to a measurement reporting method for a Closed Subscriber Group (CSG) and a corresponding User Equipment (UE).

BACKGROUND

In a mobile communication system, in order to meet a requirement on mobility, after establishing a connection with a network in a cell, the UE still needs to measure the quality of the signals of its neighboring cells to select a proper cell for handover. Taking an Evolved Universal Terrestrial Radio Access Network (EUTRAN) as an example, the specific process of the measurement of a UE in a connected state is as follows:

the network sends a measurement control message to the UE, wherein the measurement control message contains a Measurement Identity (MID), an event type, a measurement object, and an attribute to be measured;

the UE initializes parameters according to the MID in the measurement control message and acquires the attribute and measurement result of each of all measurement objects in the measurement control message;

the UE performs event evaluation on the measurement result of each measurement object according to the initialized parameters or a preset threshold, and determines, through the evaluation, the measurement object in all measurement objects which meets a condition that the period during which a triggering condition for an measurement event is met is greater than or equal to the length of a preset Time To Trigger (TTT);

the UE places these measurement objects meeting the event triggering condition (the measurement objects refer to corresponding cells at this moment) in the cell list (cellsTriggeredList) of the MID corresponding to the event; and the UE generates a measurement report according to the measurement result of the determined measurement objects and sends the measurement report to the network, the measurement objects contained in the measurement report are all acquired from the cell list of the MID corresponding to the event.

In a mobile communication system, a measurement configuration comprises an MID, a measurement object, the form of measurement reporting (e.g. event-triggered reporting or periodical reporting), etc, wherein the measurement object takes a frequency or a set of cells on a frequency as a unit. An MID corresponds to a certain measurement object and a specific measurement reporting configuration which means a reporting attribute, and different measurement reporting configurations of the same measurement object correspond to different MIDs. For a type of event triggered measurement configuration, there is one-to-one mapping between a measurement reporting configuration and a measurement event (at this moment, one MID describes one measurement object and one measurement event corresponding to the measurement object). The currently-defined measurement event generally comprises the triggering condition, the leave condition, the specific threshold (Thresh), the hysteresis parameter Hys and the offset of the event and the duration of the triggering condition for the event.

To meet the requirement of a UE in a connected state on mobility, the UE is required to measure neighboring cells and report the measurement objects that meet the triggering condition for an event. At present, some measurement events have been defined for neighboring cells, for instance, a triggering condition for a measurement event is defined as that the signal quality of a neighboring cell is higher than a certain threshold, or that the signal quality of a neighboring cell is a specific offset higher than that of the current serving cell.

For an event-triggered measurement reporting, there are two ways of reporting: 1, single event-triggered reporting (or called even-triggered measurement reporting); 2, periodical event-triggered reporting. The single event-triggered reporting means that a network configures an event triggering condition for a UE, after performing detection and evaluation and determining that a measurement object meets the event triggering condition, the UE places the measurement objects meeting the event triggering condition in a cell list of the MID corresponding to the event, and the measurement report is only reported once, wherein the measurement objects contained in the report are all acquired from the cell list. If there are new measurement objects meeting the event triggering condition later, the UE will place the new measurement objects in the cell list of the MID corresponding to the event, and report the new measurement report, the measurement objects contained in the new measurement report are all acquired from the cell list at this moment, and the report is still only reported once.

Periodical event-triggered reporting means that a network configures an event triggering condition for a UE, after performing detection and evaluation and determining that a measurement object meets the event triggering condition, the UE places the measurement objects meeting the event triggering condition in a cell list of the MID corresponding to the event, wherein the measurement report is reported many times, the number of times of the reporting and the time interval of the reporting are both configured by the network, and the measurement objects contained in the measurement report reported every time are all acquired from the cell list currently reported. During or after many times of reporting, if there are new measurement objects that meet the event triggering condition, the UE will reset the number of reporting times, place the new measurement objects in the cell list of the MID corresponding to the event, and orderly report the measurement results again according to the reset number of reporting times and a set time interval. The measurement objects contained in each measurement report are acquired from the cell list currently reported.

A network may also configure, for a UE, periodical measurements to report the strongest cells (reportStrongestCells), in this case, the UE needs to report, at a certain time, the first several cells with the strongest signal quality measured at a certain frequency. As limited by the maximum number (maxReportCells) of the reported cells, the UE reports the first maxReportCells cells with the strongest signal at this frequency every time. The value of maxReportCells is configured by the network.

As regards the measurement on a measurement object, different systems use different measurement methods, all of which reflect the signal quality of a cell. In a Long Term Evolution (LTE) system, a UE measures Reference Signal Received Power (RSRP for short, taking dBm as unit), or Reference Signal Received Quality (RSRQ for short, taking dB as unit). In WCDMA, a UE measures the Received Signal Code Power (RSCP for short, taking dBm as unit) of a common pilot channel) or the Ec/No (taking dB as unit) of a common pilot channel. A UE needs to compare the measurement results of the same type when comparing the signal qualities of different cells. When it is evaluated that a measurement object meets an event triggering condition, a complete description on the measurement object comprises not only the RSRP or RSRQ measured by the UE but also the frequency specific offset (Ofn) of the measurement object and a cell specific offset (Ocn). Taking the A4 event defined in an LTE as an example: the signal quality of a neighboring cell is higher than a threshold, the specific mathematic expression is Mn+Ofn+Ocn−Hys>Thresh, wherein Mn represents the RSRP or RSRQ of a neighboring cell measured by the UE.

In the construction of a modern radio network system, indoor coverage is of the highest importance. A suitable indoor coverage scheme can, on the one hand, maximize the effect of a network and create greater value for operators, and on the other hand, greatly reduce the network construction cost of operators to achieve the goal of "high return with low investment". On this ground, a radio access equipment called Home NB is developed. A home NB, as a resource dedicated to private subscribers, is deployed in private places such as families, groups, companies or schools to provide subscribers with various high-speed radio access services as well as a discount in charges and solve the problem of insufficient coverage of the existing distributed cellular radio communication system.

At present, there are three access modes for a Home NB: open mode, closed mode and hybrid mode. In the open mode, a Home NB allows the access of all subscribers, in this case, the Home NB cell is a macro cell. In the closed mode, a Home NB only allows the access of authorized subscribers, e.g. family members, group members, etc., which are referred to as a Closed Subscriber Group (CSG). Authorization information is saved in a Universal Subscriber Identity Module (USIM) of a UE. In the hybrid mode, a Home NB allows the access of all subscribers, and provides priority or discount for subscribers of the CSG. A cell covered by a macro NB (NodeB or eNodeB) is called a macro cell, while a cell covered by a Home NB is called a CSG cell with a CSG ID (Identity). A UE determines whether a CSG cell allows its access by determining the access mode of a Home NB to which the CSG cell belongs and/or information contained in an allowed CSG list saved in a USIM. For a specific UE, the number of the accessible CSG cells is generally limited, so the UE can locally save the information of CSG cells which has been accessed by the UE, which is called footprint information, and with the footprint information, the UE can enter a CSG cell accurately and quickly during a re-selection and handover.

A Home NB can use a dedicated frequency resource reserved by an operator, which is called a CSG dedicated frequency, or use a frequency resource identical to frequency resource used by a macro NB, which is called a mixed frequency. Cells with the same frequency are differentiated by a Physical Layer Identity (PCI). When a Home NB and a macro NB use the same frequency, the operator will specifically reserve a PCI resource (PCI split) for the Home NB, wherein a CSG cell uses the PCI in the PCI split. Like a macro cell, a CSG cell has a PCI and a Cell Global Identifier (CGI). As the number of physical layer identities are limited, with the increasing deployment of Home NBs, a PCI cannot uniquely represent one CSG cell, while a CGI is unique in the range of a Public Land Mobile Network (PLMN), a UE and a macro NB can uniquely determine a CSG cell only after acquiring a CGI.

With the increasing deployment of Home NBs, the handover of a UE between a macro cell and a CSG cell or between CSG cells is inevitably required to meet the requirement on mobility. As a kind of plug-and-play device with mobility, Home NBs are deployed in large number, typically, no neighbor relationship is configured between a macro cell and a CSG cell, that is, a UE cannot acquire the information of a neighboring CSG cell when handing over from a macro cell to a CSG cell, and a UE needs to make a real-time detection to acquire the CSG ID, the CGI, the TAC (Tracking Area Code), the PLMN of a CSG cell and other information to achieve the purpose of handover. At the same time, as a UE can enjoy a priority or discount in some authorized CSG cells, a UE needs to be handed over to a suitable CSG cell as soon as possible.

In an idle state, a UE automatically searches for suitable CSG cells on a mixed frequency or a dedicated frequency that are not configured in a system message; in a connected state, a UE also needs to automatically search for accessible CSG cells on a mixed frequency or a dedicated frequency. However, according to the existing protocol, a UE cannot evaluate a CSG cell that is not on a mixed frequency or a dedicated frequency in a measurement configuration. At the same time, due to the limitation on the format of a measurement report, a UE cannot report a CSG cell that is not on a mixed frequency or a dedicated frequency in a measurement configuration. However, if a network configures, for a UE, a measurement configuration on a dedicated frequency, using the existing reporting mechanism by the UE will cause many useless measurement reports, because the CSG cells inaccessible to the UE may be reported in the measurement reports, and the performance of the network will be seriously affected by these useless measurement reports, this problem will cause a UE in a connected state cannot access a CSG cell smoothly and preferentially.

SUMMARY

The technical problem the present invention aims to solve is to provide a measurement reporting method for a CSG cell and a corresponding UE, which can meet the requirement of a UE on the mobility of a CSG cell, avoiding a large number of useless measurement reports.

To solve the technical problem above, the present invention provides a measurement reporting method for a Closed Subscriber Group (CSG) cell, comprising:

a User Equipment (UE) in a connected state finds a neighboring CSG cell and reports, if the CSG cell is accessible and a measurement result of the CSG cell meets a condition, a measurement report containing the CSG cell to a network.

The measurement reporting method may also have the following characteristics:

the UE in a connected state initiatively detects a CSG cell that is not on a frequency in a measurement configuration, and then reports, if it is determined that the UE can access the CSG cell and the signal quality of the CSG cell meets a preset condition, a measurement report containing the CSG cell to a network.

The measurement reporting method may have the following characteristics, and the preset condition is one or more of the following conditions:

a) the CSG cell is the cell or one of the several cells with the strongest signal quality on the frequency of the CSG cell;

b) the signal quality of the CSG cell exceeds a preset threshold; and c) the signal quality of the CSG cell is a preset offset higher than that of the serving cell.

The measurement reporting method may also have the following characteristics:

the UE uses a default configuration parameter to evaluate whether the signal quality of the CSG cell exceeds a preset threshold, or evaluate whether the signal quality of the CSG cell is a preset offset higher than that of the serving cell, and makes the CSG cell be reported preferentially using the default configuration parameter if the CSG cell is in a allowed access list of a USIM of the UE.

The present invention further provides a measurement reporting method for a Closed Subscriber Group (CSG), comprising:

a UE in a connected state initiatively detects a neighboring CSG cell that is not on a frequency in a measurement configuration, then determines whether the UE can access the CSG cell, and reports, if the UE can access the CSG cell, an indication request for a measurement configuration to a network; the indication request reported by the UE to the network contains frequency information of the CSG cell and/or bandwidth information of the CSG cell. The measurement reporting method may also be characterized in that: in the step of determining whether the UE can access the CSG cell, if the access mode of a Home NB to which the CSG cell belongs is a closed mode or a hybrid mode and the CSG cell is in a CSG list of the UE, then it is determined that the UE can access the CSG cell.

The measurement reporting method may also have the following characteristics: in the step of determining whether the UE can access the CSG cell, if the access mode of a Home NB to which the CSG cell belongs is a hybrid mode and the CSG cell is not in a CSG list of the UE, then it is determined that the UE can access the CSG cell.

The measurement reporting method may also comprise the following steps: after receiving the indication request, the network sends the UE a measurement configuration containing the frequency of the CSG cell; after receiving the measurement configuration, the UE performs a measurement and reports a measurement report according to the measurement configuration.

The measurement reporting method may also have the following characteristics:

the measurement configuration containing the frequency of the CSG cell contains a measurement gap.

The measurement reporting method may also have the following characteristics:

the network sends the UE in a connected state a measurement configuration containing an indication dedicated to the CSG cell or a measurement configuration dedicated to the CSG cell; and after receiving the measurement configuration containing the dedicated indication or the dedicated measurement configuration, the UE performs measurement according to the measurement configuration and, when the CSG cell meets the reporting condition in the measurement configuration and the UE can access the CSG cell, reports the measurement report containing the CSG cell.

The measurement reporting method may also have the following characteristics:

the measurement configuration containing an indication dedicated to the CSG cell refers to a measurement configuration in which a measurement identity is correspondingly arranged with an identity dedicated to the CSG cell;

the measurement configuration dedicated to the CSG cell refers to a measurement configuration in which a measurement object corresponding to a measurement identity has no frequency information or has information of multiple frequencies.

The measurement reporting method may also have the following characteristics:

the measurement report contains identity information which is needed by the network to uniquely determine the CSG cell; or the measurement report contains identity information which is needed by the network to uniquely determine the CSG cell and a result of a measurement on the signal quality of the CSG cell; or the measurement report contains identity information which is needed by the network to uniquely determine the CSG cell, a result of a measurement on the signal quality of the CSG cell, and one or more pieces of the following information: a CSG ID of the CSG cell, a default MID, frequency information of the CSG cell, bandwidth information of the CSG cell, the access mode of the Home NB to which the CSG cell belongs, and indication information indicating that the UE accesses the CSG cell as a member or a non-member.

The measurement reporting method may also have the following characteristics:

the CSG cell belongs to an LTE system; and the identity information which enable the network to uniquely determine the CSG cell is: a physical layer identity and a cell global identifier; or a physical layer identity, a cell global identifier and a tracking area code; or a physical layer identity, a cell global identifier, a tracking area code, and a public land mobile network identity; or the CSG cell belongs to a UTRAN system; and the identity information which enable the network to uniquely determine the CSG cell is: a primary scrambling code and a cell global identifier; or a primary scrambling code, a cell global identifier and a location area code; or a primary scrambling code, a cell global identifier and a routing area code; or a primary scrambling code, a cell global identifier, a location area code and a routing area code; or a primary scrambling code, a cell global identifier, a location area code, a routing area code, and a public land mobile network identity.

The measurement reporting method may also have the following characteristics:

the UE reads the access mode of the Home NB to which the CSG cell belongs and/or the CSG ID of the CSG cell from a system message of the CSG cell or from information of the CSG cell stored by the UE, and it is determined that the UE can access the CSG cell if one of the following conditions is met:

A) the access mode of the Home NB to which the CSG cell belongs is a closed mode or a hybrid mode, and the CSG cell is in the CSG list of the USIM of the UE;

B) the access mode of the Home NB to which the CSG cell belongs is an open mode;

C) the access mode of the Home NB to which the CSG cell belongs is a hybrid mode, and the CSG cell is not in the CSG list of the USIM of the UE.

The measurement reporting method may also have the following characteristics: the frequency information containing the frequency of the CSG cell contains information of one or multiple frequencies.

The present invention also provides a User Equipment (UE) capable of realizing measurement reporting for a CSG cell, the UE is configured to: initiatively detect, when it is in a connected state, a CSG cell that is not on a frequency in a measurement configuration, and then report, if it is determined the UE can access the CSG cell and the signal quality of the CSG cell meets a preset condition, a measurement report containing the CSG cell to a network, wherein the measurement report contains identity information which is needed by the network to uniquely determine the CSG cell, and the identity information contains a cell global identifier of the CSG cell.

The UE may also have the following characteristics: the preset condition adopted by the UE is one or more of the following conditions:

a) the CSG cell is the cell or one of the several cells with the strongest signal quality on the frequency of the CSG cell;

b) the signal quality of the CSG cell exceeds a preset threshold; and c) the signal quality of the CSG cell is a preset offset higher than that of a serving cell.

The present invention also provides a User Equipment (UE) capable of realizing measurement reporting for a Closed Subscriber Group (CSG) cell. The UE is configured to: initiatively detect, when it is in a connected state, a neighboring CSG cell that is not on a frequency in a measurement configuration, then determine whether the UE can access the CSG cell, report, if it is determined the UE can access the CSG cell, an indication request for a measurement configuration to a network, and perform measurement and report a measurement report according to the measurement configuration after receiving the measurement configuration which is sent by the network and contains the frequency of the CSG cell.

The UE is configured to determine whether the UE can access the CSG cell in the following way: the UE determines that the UE can access the CSG cell if it is determined that the access mode of a Home NB to which the CSG cell belongs is a closed or hybrid mode and the CSG cell is in a CSG list of the UE.

The UE determines whether the UE can access the CSG cell in the following way: the UE determines that the UE can access the CSG cell if it is determined that the access mode of the Home NB to which the CSG cell belongs is a hybrid mode and the CSG cell is not in a CSG list of the UE.

The UE is configured to detect a neighboring CSG cell which is not on a frequency in a measurement configuration from a system message of the CSG cell or from information of the CSG cell stored by the UE, and determine whether it can access the CSG cell.

The indication information contains information of one or multiple frequencies of the CSG cell.

The measurement configuration containing the frequency of the CSG cell contains a measurement gap.

The present invention also provides a User Equipment (UE) capable of realizing measurement reporting for a Closed Subscriber Group (CSG) cell. The UE is configured to: perform, after receiving a measurement configuration containing an indication dedicated to the CSG cell or a measurement configuration dedicated to the CSG cell, measurement according to the measurement configuration, and report, if the CSG cell meets a reporting condition in the measurement configuration and the UE can access the CSG cell, a measurement report containing the CSG cell, wherein The measurement configuration containing an indication dedicated to the CSG cell refers to a measurement configuration in which a measurement identity is correspondingly arranged with an identity dedicated to the CSG cell; and the measurement configuration dedicated to the CSG cell refers to a measurement configuration in which a measurement object corresponding to a measurement identity has no frequency information or has information of multiple frequencies.

With the method and the UE above, the UE can evaluate whether a CSG cell that is not on a frequency in a measurement configuration meets a signal quality condition, and report, if the condition is met and the CSG cell is accessible, a measurement report. The present invention solves the problem of the measurement and reporting of a CSG cell by a UE, so that a network can make a decision in time according to the measurement report, meeting the requirement of the UE on mobility.

DETAILED DESCRIPTION OF THE INVENTION

Through analysis, it is found that the reason why the existing measurement reporting mechanism is incapable of guaranteeing the preferential handover of a UE to a CSG cell lies in that: as a measurement configuration sent from a network to a UE may not contain certain frequencies on which accessible CSG cells exists, wherein these frequencies may be mixed or dedicated frequencies, after initiatively detecting an accessible CSG cell on these frequencies, a UE cannot perform reporting, resulting in that the network cannot make a decision to realize the preferential handover of a UE to the CSG cell.

In the following, several specific embodiments for solving this problem are described in detail in combination with accompanying drawings. In these embodiments, a UE cannot perform measurement reporting for a CSG cell according to the existing measurement configuration. In these embodiments, although whether to perform a reporting is determined through different evaluation method, reporting is always performed after it is determined that the UE can access a CSG cell, thus avoiding reporting a great number of useless reports.

Embodiment 1

In this embodiment, a UE in a connected state initiatively detects a CSG cell that is not on a frequency in a measurement configuration. If it is determined that the UE can access the CSG cell and the signal quality of the CSG cell meets a preset condition, a measurement report containing the CSG cell is reported to a network.

The CSG cell usable to the UE refers to a CSG cell which is accessible to the UE and whose signal quality meets the condition. Reporting such a cell can avoid a great number of useless measurement reports.

Figure 1:
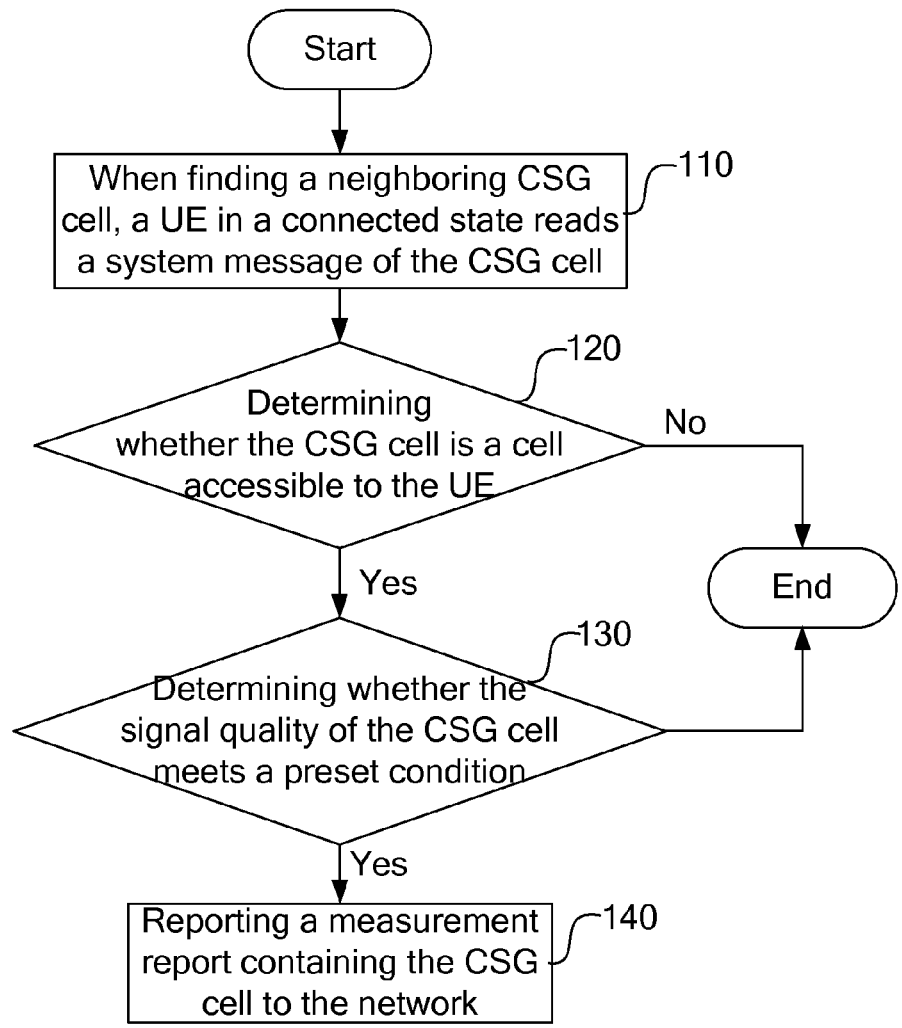
FIG. 1 is a flowchart illustrating a method according to Embodiment 1 of the present invention.

As shown in FIG. 1, a measurement reporting method for a CSG cell in this embodiment comprises the following steps:

step 110: a UE in a connected state, after finding a neighboring CSG cell, reads a system message of the CSG cell;

step 120: It is determined whether the CSG cell is a cell accessible to the UE according to the system message of the CSG cell;

considering that in the existing technology, when measuring a neighboring macro cell, a UE does not need to read a system message of the neighboring macro cell, using the same method will result in that whether a CSG is usable can't be determined. Therefore, in this embodiment, when detecting a neighboring CSG cell, a UE reads a system message of the neighboring CSG cell to determine whether the CSG cell is accessible. In other embodiments, the UE can also determine whether a CSG cell is accessible by reading the CSG cell information stored by the UE;

specifically, a UE determines whether a CSG cell is accessible according to the access mode of the Home NB to which the CSG cell belongs and/or the CSG ID of the CSG cell. A CSG cell is accessible in the following cases:

1) the access mode of the Home NB to which the CSG cell belongs is a closed or hybrid mode, and the CSG cell is in the allowed CSG list of the USIM of the UE;

2) the access mode of the Home NB to which the CSG cell belongs is an open mode; and 3) the access mode of the Home NB to which the CSG cell belongs is a hybrid mode, and the CSG cell is not in the allowed CSG list of USIM of the UE;

when determining to perform a handover, the network takes a CSG cell which meets the condition 1) as a target cell to be handed over, because a member subscriber of the CSG cell can enjoy a discount in charges and other preferences, the member subscriber can acquire a radio resource preferentially once it accesses the CSG cell;

step 130: it is determined whether the signal quality of the CSG cell meets the preset condition;

the preset condition may be, for example, one of the following conditions:

1) the CSG cell is the cell or one of the several cells with the strongest (namely, best) signal quality on the frequency of the CSG cell, and the number of cells may be configured by default;

2) the signal quality of the CSG cell exceeds the preset threshold, the preset threshold may be configured by default;

3) the signal quality of the CSG cell is a preset offset higher than that of a serving cell, the preset offset may be configured by default;

in other embodiments, the number of the cells, the preset threshold, the preset offset and other parameters may also be configured by a network and notified to all UEs through a system message;

the sequence of step 130 and step 120 may be adjusted, that is, a CSG cell that meets the signal quality condition may be found first, and then it's determined whether the CSG cell is accessible;

step 140: a measurement report containing the CSG cell is reported to the network.

In this embodiment, the measurement report also contains the identity information which is needed by the network to uniquely determine the CSG cell and measurement result.

For an LTE system, the UE-reported identity information which is needed by the network to uniquely determine the CSG cell may comprise a PCI, CGI, TAC, and PLMN. In some embodiments, based on a default means of expression or a means of expression agreed by a UE and a network, the UE may also only carry part of the identity information above to save the air interface resource. For example, if a CSG cell has the same TAC and PLMN with the current serving cell, then the UE can report only PCI and CGI; or if the CSG cell is in the same PLMN with the current serving cell, with a TAC different from that of the current serving cell, the UE needs to report a PCI, CGI and TAC. If a network can effectively differentiate CSG cells to avoid a PCI confusion, then the UE only needs to report a PCI to determine a CSG cell uniquely. The CGI is also used to constitute routing information together with the TAC or LAC, RAC.

For a UTRAN system, the UE-reported identity information which is needed by the network to uniquely determine the CSG cell may comprise: a PSC, CGI, LAC, RAC and PLMN. In some embodiments, based on a default means of expression or a means of expression agreed by a UE and a network, the UE may also carry part of the identity information above. For example, if the CSG cell has the same LAC, RAC and PLMN with the current serving cell, the UE may report only PSC and CGI, or based on specific situation, the UE reports a PSC, CGI and LAC; or reports a PSC, CGI and RAC; or reports a PSC, CGI, LAC and RAC; or reports a PSC, CGI, LAC, RAC and PLMN. If the network can effectively differentiate CSG cells to avoid a PSC confusion, then the UE only needs to report a PSC to determine a CSG cell uniquely. CGI is also used to constitute routing information together with the TAC, or LAC, RAC.

Besides the information above, the measurement report may also contain one or more of the following: the CSG ID of the CSG cell and the access mode information, a default MID, the frequency information of the CSG cell, and the bandwidth information of the CSG cell. The access mode information contains: the access mode of the Home NB to which the CSG cell belongs, and/or the information indicating that through which means (e.g, as a member or non-member) the UE accesses the CSG cell, that is, the information about whether the CSG cell is in the allowed CSG list of the UE. The measurement report may adopt a default MID agreed in a protocol. If no default MID is adopted, the frequency of the CSG cell is a valuable reporting parameter. Of course, the case where neither a default MID nor a frequency is reported is not excluded.

If the UE detects multiple CSG cells on a frequency, and the multiple cells are accessible and their signal qualities meet a preset condition, then the multiple CSG cells can be contained in one measurement report.

The realization process of Embodiment 1 is described in detail in conjunction with several application examples.

EXAMPLE 1

Figure 2:
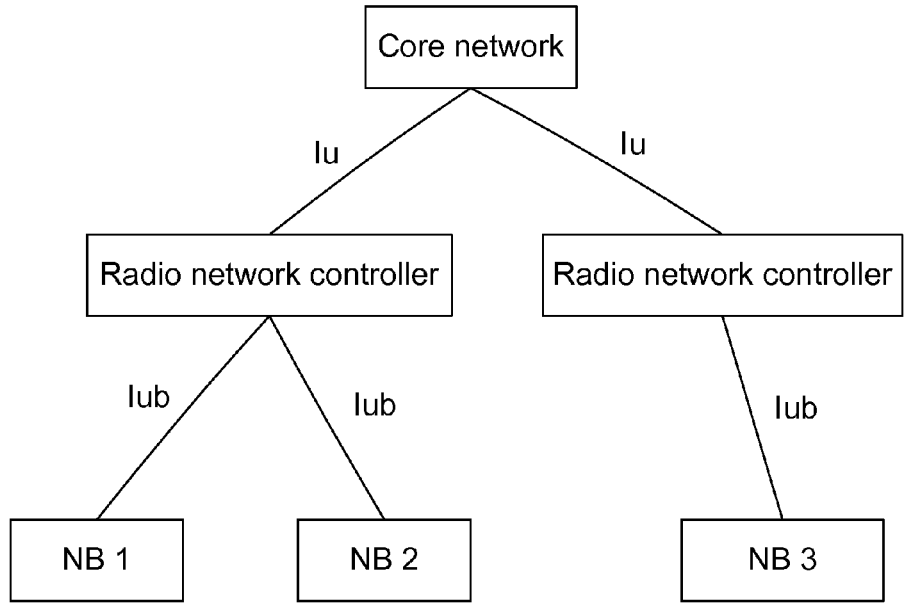
FIG. 2 is a schematic diagram illustrating the network layout of a WCDMA.

The network layout of a WCDMA system is as shown in FIG. 2. An Iub interface exists between a Radio Network Controller (RNC) and the NB to which the RNC belongs. Assuming that a UE is located in a cell of NB 1, and the UE is in a connected state and has an allowed accessible CSG list, then the specific process that the UE performs measurement reporting is as follows:

an RNC sends a measurement control message to the UE, wherein the measurement control message comprises an MID, the information of a neighboring cell to be measured, and TTT and other measurement configuration. The UE initializes the parameters of all MIDs according to the information in the measurement control message, performs evaluation and determines all measurement objects meeting a reporting condition according to the initialized parameters, and generates and sends a measurement report to the RNC.

At a certain moment of the process, the UE initiatively detects a neighboring CSG cell on a frequency f1 in a LTE system, and acquires the CSG ID and the access mode (closed mode) of the CSG cell by reading a system message of the CSG cell. The UE finds that the CSG ID is in the allowed accessible CSG list and the signal quality of the CSG cell on the frequency f1 is the best. As the frequency f1 is not in the measurement control message sent by the RNC, the UE reports a measurement report containing the CSG cell to the network, the measurement report adopts a default MID.

The measurement report also contains the CGI, TAC, PLMN and PCI of the CSG cell which have been acquired by the UE, and may further contain the CSG ID of the CSG cell and access mode information, wherein the access mode information contains the access mode (closed mode) of the CSG cell and the information indicative of the access means (e.g.

as a member) of the UE to the CSG cell. The measurement report may further contain an RSRP or RSRQ, which is the result of a measurement on the signal quality of the CSG cell.

After acquiring the measurement report, the RNC determines to perform a handover and makes the UE hand over to the CSG cell, achieving the purpose of preferential access to the CSG cell. The handover strategy set in the RNC enables the preferential handover of the UE to a CSG cell which can be accessed as a member.

EXAMPLE 2

Figure 3:
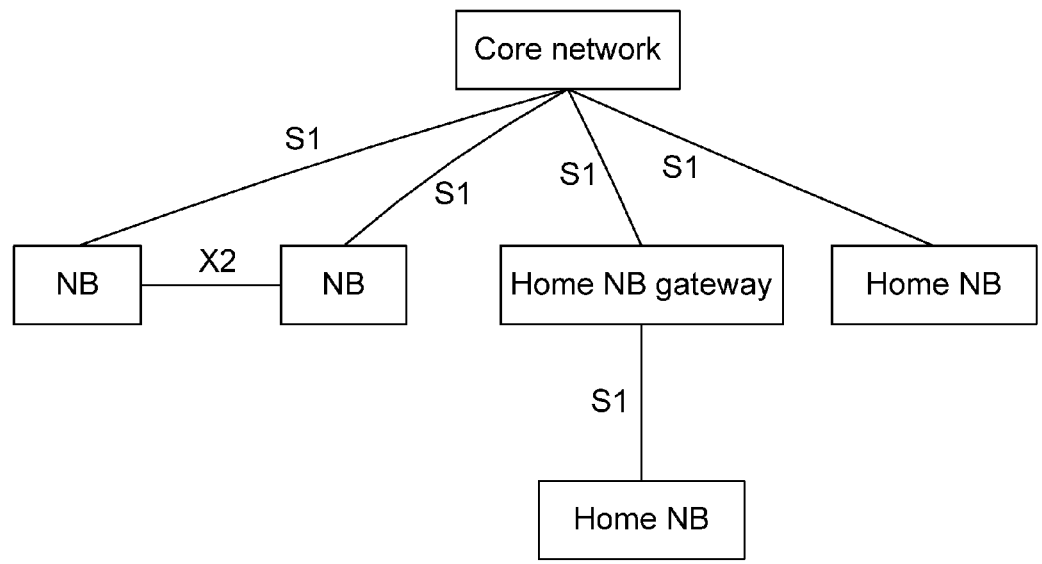
FIG. 3 is a schematic diagram illustrating the network layout of an LTE system.
Figure 4:
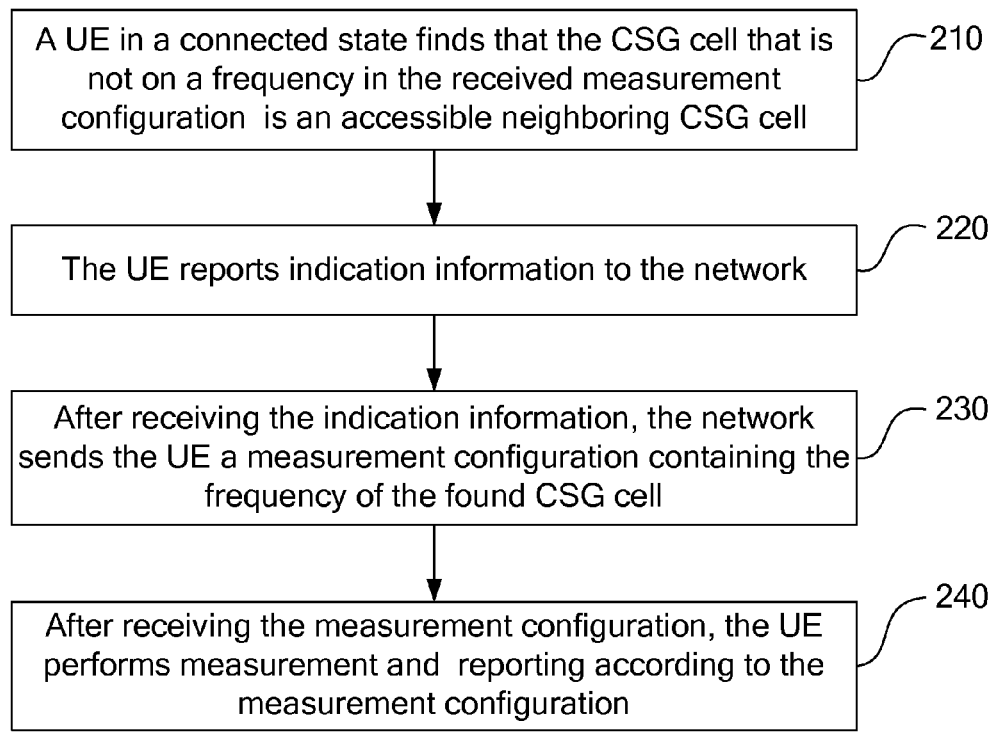
FIG. 4 is a flowchart illustrating the method of Embodiment 2 of the present invention.

The network layout of an LTE system is shown as in FIG. 3. There is an S1 interface between a core network and a NB (Macro NB) and there is an X2 interface between neighboring NBs; a Home NB may be connected with the core network directly, or be connected with the core network through a Home NB gateway, and there is no X2 interface between Home NBs or between a Home NB and a macro NB. A UE is located in a cell belonging to a macro NB and is in a connected state and has an allowed accessible CSG list.

The macro NB sends a measurement control message to the UE, wherein the measurement control message comprises an MID, the information about a neighboring cell to be measured, and TTT and other measurement configuration information. The UE initializes the parameters of all MIDs according to the information in the measurement control message, performs evaluation and determines all the measurement objects that meet a reporting condition according to the initialized parameters, and generates and sends a measurement report to the Macro NB. The measurement configuration comprises an MID 1, it is defined that the signal quality of a neighboring cell on a frequency f2 is a preset offset higher than that of a serving cell (on a frequency f1), the frequency specific offset of the frequency f2 is Ofn, different neighboring cells on the frequency f2 have their respective cell specific offsets Ocn, the frequency specific offset of the serving cell is Ofs, and the cell specific offset of the serving cell is Ocs.

At a certain moment of the process, the UE initiatively detects a CSG cell (Cell 1) on a frequency f3 in the LTE system, acquires the CSG ID and access mode (hybrid mode) of the CSG cell by reading a system message of the CSG cell or by using the information of the CSG cell saved by the UE itself (the UE saves complete information of the CSG cell, such as location, frequency, PCI, CSG ID, CGI, etc; the UE can deduce that the neighboring cell is the saved CSG cell according to accurate information such as location), and then finds that the CSG ID is in the allowed accessible CSG list. As the frequency f3 is not contained in the frequencies of the measurement configuration, the UE uses default configuration parameters to evaluate that the signal quality of the CSG cell is a preset offset higher than that of the serving cell (in this example, the default frequency specific offset Ofn of the CSG cell equals to Ofs, the cell specific offset Ocn is 0; it should be noted that, for a neighboring CSG cell in the allowed accessible CSG list of the UE, its values of Ofn and Ocn should reflect preferential reporting of the CSG cell and can be default values or corresponding value of the serving cell, or the maximum value in the measurement configuration; the preset offset is 0, and the default TTT value is 100 ms). At this moment, the UE reports a measurement report containing the CSG cell, the measurement report contains the frequency information and bandwidth information of the CSG cell and also contains the CSG ID, the CGI and the PCI (TAC and PLMN are not reported as they are the same as those of the current serving cell) of the CSG cell that are already acquired by the UE, and may also contain access mode information (the access mode of the CSG cell and the access of the UE as a member), and measurement report may further contain an RSRP or RSRQ, which is the result of a measurement on the signal quality of the CSG cell. If the network can effectively differentiate CSG cells to avoid a PCI confusion, the UE only needs to report a PCI to represent the identity of the CSG cell.

In a modification of the example above, at a certain moment of the process, the UE initiatively detects a CSG cell (Cell 2) on a frequency f4 in an LTE system, acquires the CSG ID and the access mode (closed mode) of the CSG cell by reading a system message of the CSG cell, and finds that the CSG ID is in the allowed accessible CSG list. At the same time, as the frequency f4 is not in the measurement configuration, the UE uses a default parameter to evaluate the CSG cell and then finds that the signal quality of the CSG cell exceeds a preset threshold (the frequency specific offset Ofn of the CSG cell equals Ofs; the cell specific offset of the CSG cell is 0; for an RSRP, the preset threshold is 50 (effective value is 0~97), and a TTT takes the default value 200 ms). Once TTT is overtime, the UE immediately reports a measurement report containing the CSG cell, wherein the measurement report contains the frequency information and the bandwidth information of the CSG cell, may further contain the CGI and the PCI (TAC and PLMN are not reported as they are the same as those of the current serving cell) of the CSG cell (Cell 2) that are already acquired by the UE, and may further contain an RSRP which is the result of a measurement on the signal quality of the CSG cell, and may even contain a CSG ID and access mode information. It should be noted that, if the network can effectively differentiate CSG cells to avoid a PCI confusion, the UE will only need to report a PCI to represent the identity of the CSG cell; and if the network can initiatively acquire the access mode and the CSG ID of the CSG cell for an access control, the UE does not need to report the CSG ID and the access mode information.

After acquiring the measurement report, the Macro NB determines to perform a handover and makes the UE hand over to the CSG cell (Cell 2) on the frequency f4.

EXAMPLE 3

Taking an LTE system as an example, a UE is located in a cell belonging to a macro NB (or a Home NB) and is in a connected state and has an allowed accessible CSG list.

The Macro NB (or the Home NB) sends the UE a measurement control message comprising two measurement configurations for two frequencies. The measurement control message comprises an MID 1 and an MID 2 (the MID 1 corresponds to a frequency f1 and a measurement event A4; the MID 2 corresponds to a frequency f2 of the UTRAN system and a measurement configuration of the reported strongest cells, the number (maxReportCells) of the reported strongest cells configured at the network is 3), the information of the neighboring cell to be measured, and a TTT, etc. The event A4 is an event-triggered single reporting. The event A4 means that the signal quality of the neighboring cell is higher than a preset threshold. The MID 2 is a periodical measurement configuration. The UE measures a neighboring cell on the frequency f2 and reports the result of a measurement on the strongest cell (or cell sets) periodically.

The UE initializes parameters of the MID 1 and the MID 2 according to the information in the measurement control message; the UE conducts an event evaluation on the measurement result of the neighboring cell according to the initialized parameters and the preset threshold for the event A4, and determines all neighboring cells meeting a condition that the period during which a trigger condition for the measurement event A4 is met is greater than or equal to TTT; the UE places all the neighboring cells that meet the event triggering condition in the cell list of the corresponding MID and generates a measurement report of the event A4 and sends the measurement report to the NB.

At a certain moment of the process, the UE detects a CSG cell (Cell 1) on the frequency f3 in a WCDMA system, acquires the CSG ID and the access mode (closed mode) of the CSG cell by reading a system message of the CSG cell, and finds that the CSG ID is in the allowed accessible CSG list. At the same time, as the frequency f3 is not in the measurement configuration, the UE uses default parameters to evaluate the CSG cell and finds that the CSG cell has the best signal quality on this frequency. Then, the UE reports a measurement report containing the CSG cell. The measurement report contains the frequency information of the CSG cell, and may further contain the CSG ID, the CGI, the LAC (Location Area Code), the RAC (Routing Area Code), the PLMN, and the PSC (Primary Scrambling Code) of the CSG cell that are already acquired by the UE, and may further contain the result of a measurement on the signal quality of the CSG cell.

In a modification of this example, at a certain moment of the process, the UE initiatively detects CSG cells (cell 2 and cell 3) on a frequency f4 in the LTE system, acquires the CSG IDs and the access modes (the NB to which Cell 2 belongs is closed, while the NB to which Cell 3 belongs is hybrid) of the two CSG cells by reading system messages of the two CSG cells, and finds that the CSG ID of the cell 2 is in the allowed accessible CSG list and the CSG ID of the cell 3 is not in the list. At the same time, as the frequency f4 is not in the measurement configuration, the UE adopts default parameters to evaluate the two CSG cells and finds that the signal qualities of both of the two CSG cells exceed a preset threshold (the frequency specific offsets of the CSG cells are default values, and the cell specific offsets of the CSG cells are 0; for an RSRP, the preset threshold is 48 (effective value is 0-97), and the default value of TTT is 200 ms). Once the TTT is overtime, the UE immediately reports a measurement report containing the two CSG cells. The measurement report contains the frequency information of the two CSG cells, may further contain the CGI and the PCI (TAC and PLMN are not reported because they are the same as those of the current serving cell) of the two CSG cells that are already acquired by the UE, and may also contain the CSG IDs of the two CSG cells and the access mode information (the access modes of the two CSG cells, and information that the UE accesses the Cell 2 as a member and accesses the Cell 3 as a non-member); and may also contain an RSRP which is the result of a measurement on the signal qualities of the two CSG cells.

After acquiring the measurement report, the NB determines to perform a handover and makes the UE to hand over to the CSG cell (Cell 2) on the frequency f4.

Embodiment 2

In this embodiment, after finding that a CSG cell that is not on a frequency in a measurement configuration is a neighboring accessible CSG cell, a UE requests a network to send a measurement configuration for the frequency of the CSG cell, and performs measurement and reporting according to the measurement configuration. The specific steps are as follows:

step 210: a UE in a connected state finds that a CSG cell that is not on a frequency in a measurement configuration is a neighboring accessible CSG cell;

the UE determines whether it can access the CSG cell by using the method which is described in Embodiment 1 and therefore not repeated here;

step 220: the UE reports an indication request to the network;

in this embodiment, the indication request contains the frequency information of the detected CSG cell; if the CSG cell is on multiple frequencies, frequency information of the multiple frequencies should be reported; in other embodiments, the indication request may also contain bandwidth information; the network may provide a measurement configuration for each remaining usable frequency and send the UE the measurement configuration containing the frequency of the CSG cell, therefore, it is also possible that in this step the indication request does not contain the frequency information of the CSG cell;

step 230: after receiving the indication request, the network sends the UE a measurement configuration containing the frequency of the found CSG cell; and step 240: after receiving the measurement configuration, the UE performs a measurement and reporting according to the measurement configuration.

In the following, the realization process of Embodiment 2 is described in detail in conjunction with several application examples.

EXAMPLE 4

Taking an LTE system as an example, a UE is in a connected state and is located in a cell belonging to a macro NB and has an allowed accessible CSG list.

The Macro NB sends a measurement control message to the UE, wherein the message contains an MID, the information of a neighboring cell to be measured, and a TTT, etc. The UE initializes parameters of all MIDs according to the information in the measurement control message, performs evaluation and determines all the measurement objects that meet a reporting condition according to the initialized parameters, and generates a measurement report and sends the measurement report to the Macro NB.

At a certain moment of the process, the UE initiatively detects a CSG cell (Cell 1) on a frequency f1, acquires the CSG ID and the access mode (hybrid mode) of the CSG cell by reading a system message of the CSG cell, and finds that the CSG ID is in the allowed accessible CSG list. As the frequency f1 is not in the measurement configuration, the UE sends the Macro NB an indication request to request the network to configure, for the UE, a measurement configuration for the frequency of the CSG cell. The UE may send the network the indication request through a measurement report, or other radio interface signaling (e.g. radio connection reconfiguration completion, etc.), or through a signaling of an MAC layer. The indication request sent by the UE contains the frequency information of the CSG cell.

If the UE initiatively detects multiple CSG cells on multiple frequencies, the indication request comprises the frequency information of the multiple frequencies. After receiving the indication request, the network sends measurement configurations for the multiple frequencies at the same time.

After receiving the indication request, the network sends the UE a measurement configuration containing the frequency f1, wherein an MID 1 is defined as the frequency f1 and an event A4, and the event A4 is that the signal quality of a neighboring cell exceeds a preset threshold. The new measurement configuration also comprises a measurement gap. After receiving the new measurement configuration, the UE evaluates the signal quality of the CSG cell, and sends, if an event triggering condition is met and the duration exceeds the TTT, a measurement report for the MID 1 to the network. The measurement report contains the CGI, TAC, PLMN and PCI of the CSG cell (Cell 1) that are already acquired by the UE, and may also contain a CSG ID and access mode information, the access mode information contains the information about that the NB to which Cell belongs is in hybrid mode, and/or the information indicating that the CSG ID of the cell 1 is in the allowed CSG list of the UE; the measurement report may also contain an RSRP which is the result of a measurement on the signal quality of the CSG cell.

After acquiring the measurement report, the NB determines to perform a handover and makes the UE hand over to the CSG cell (Cell 1) on the frequency f1.

EXAMPLE 5

Taking a WCDMA system as an example, a UE is in a connected state and has an allowed accessible CSG list. The specific process that the UE performs a measurement is as follows:

an RNC sends a measurement control message to the UE. The message contains an MID, the information of a neighboring cell to be measured, and a TTT, etc. The UE initializes parameters of all MIDs according to the information in the measurement control message; the UE performs evaluation and determines all the measurement objects that meet a reporting condition according to the initialized parameters, and generates a measurement report and sends the measurement report to the RNC.

At a certain moment of the process, the UE detects a neighboring CSG cell on a frequency f1 (not the frequency where the serving cell is) in the WCDMA system, acquires the CSG ID and the access mode (closed mode) of the CSG cell by reading a system message of the CSG cell, and finds that the CSG ID is in the allowed accessible CSG list. As the frequency f1 is not in a measurement configuration, the UE sends an indication request to the RNC to request a network to configure, for the UE, a measurement configuration for the frequency of the CSG cell. The UE may send the indication request to the network through a measurement report or other radio interface signaling (radio connection reconfiguration completion, etc.). The indication request sent by the UE contains the frequency information of the CSG cell.

After receiving the indication request, the network sends a measurement configuration containing the frequency f1 to the UE. Wherein a measurement event 2b is defined as that the signal quality of a serving frequency is lower than a preset threshold and the signal quality of a non-serving frequency is higher than the preset threshold. After receiving a new measurement configuration, the UE evaluates the CSG cell, and sends, if an event triggering condition is met and the duration exceeds a TTT, a measurement report to the network. The measurement report contains the CGI, LAC, RAC, PLMN, the PSC (LAC, RAC, PLMN may not be reported if they are the same as those of the current serving cell) of the CSG cell that are already acquired by the UE, and may also contain the CSG ID of the CSG cell and the access mode information, wherein the access mode information contains the information about the access mode (closed mode) of the CSG cell and the allowed access means (e.g. accessing as a member) of the UE to the CSG cell. The measurement report may also contain an Ec/No or RSCP which is the result of a measurement on the signal quality of the CSG cell.

After acquiring the measurement report, the RNC immediately determines to perform a handover and makes the UE hand over to the CSG cell, thus achieving the purpose of preferentially accessing the CSG cell.

Embodiment 3

In this embodiment, a network sends a UE in a connected state a measurement configuration containing a indication dedicated to a CSG cell or a measurement configuration dedicated to a CSG cell; after receiving the measurement configuration, the UE performs a measurement according to the measurement configuration, and reports, if the CSG cell meets a reporting condition in the measurement configuration and the UE can access the CSG cell, a measurement report containing the CSG cell. The measurement configuration containing the dedicated indication may be, for example, a measurement configuration in which a measurement identity is correspondingly arranged with a specific identity dedicated to the CSG cell; the dedicated measurement configuration may be that, for example, a measurement object corresponding to a measurement identity has no frequency information or information of multiple frequencies.

If the UE finds multiple accessible CSG cells during the measurement and the multiple cells all meet a reporting condition for a measurement configuration, then the multiple CSG cells may be contained in one measurement report.

In the following, the realization process of Embodiment 3 is described in detail in conjunction with several application examples.

EXAMPLE 6

Taking an LTE system as an example, a UE is in a connected state and located in a cell belonging to a macro NB or a Home NB and has an allowed accessible CSG list.

The Macro NB (or Home NB) sends a measurement control message to the UE. The message contains 3 measurement configurations for 3 frequencies, an MID 1 and an MID 2 (the MID 1 is defined as a frequency f1 and a measurement event A4; the MID 2 corresponds to a frequency f2 of a UTRAN system and a measurement configuration of the reported strongest cells, the number (maxReportCells) of the reported strongest cells configured at a network is 3), the information of a neighboring cell to be measured, and a TTT, etc. The event A4, which is an event-triggered single reporting, means that the signal quality of a neighboring cell is higher than a preset threshold. The MID 2 is a periodical measurement reporting configuration. The UE measures a neighboring cell on the frequency f2 and periodically reports the measurement result of the strongest cell or cell sets. The measurement control message may also contain an MID 3, which is defined as a frequency f3 of the LTE system and the measurement event A4, and the MID 3 is correspondingly arranged with an identity dedicated to a CSG cell.

The UE initializes parameters of the MID 1, the MID 2 and the MID 3 according to the measurement configuration in the measurement control message, evaluates the measurement results of neighboring cells according to the initialized parameters, determines through evaluation all the neighboring cells that meet a trigger condition, and generates a measurement report and sends the measurement report to the NB.

As the MID 3 corresponds to the identity dedicated to a CSG cell, the UE deals with the MID 3 in such a special manner that the UE places the CSG cell in a cell list corresponding to the MID 3 only after confirming that the CSG cell on the frequency f3 is accessible and the period during which the signal quality of the CSG cell is higher than the preset threshold is greater than or equal to TTT. The UE generates a measurement report for the MID 3 and sends the measurement report to the NB.

At a certain moment of the process, the UE detects a CSG cell (Cell 1) on the frequency f3, acquires the CSG ID and the access mode (closed mode) of the CSG cell by reading a system message of the CSG cell, and finds that the CSG ID is in the allowed accessible CSG list and that the period during which the signal quality of the CSG cell is higher than the preset threshold is greater than or equal to TTT. Then the UE places the CSG cell in the cell list corresponding to the MID 3, and reports a measurement report for the MID 3, the measurement report contains the CGI, PCI and TAC (PLMN is not reported as it is the same as that of the current serving cell) of the CSG cell (cell 1), and may also contain an RSRQ which is the result of a measurement on the signal quality of the CSG cell.

After acquiring the measurement report, the NB determines to perform a handover and makes the UE to hand over to the CSG cell (Cell 1) on the frequency f3.

EXAMPLE 7

FIG. 3 is a diagram illustrating the network layout of an LTE system. A UE is in a connected state and located in a cell belonging to a macro NB or a Home NB and has an allowed accessible CSG list.

The Macro NB (or Home NB) sends a measurement control message (measurement configuration) to the UE, wherein the measurement control message contains an MID 1 and an MID 2 (the MID 1 corresponds to a frequency f1 and a measurement event A1; the MID 2 corresponds to a frequency f2 of the LTE system and a measurement event A4), the information of a neighboring cell to be measured, and a TTT, etc. the measurement event A1 means that the signal quality of a serving cell is higher than a preset threshold. The measurement control message may also contain an MID 3 applied to an LTE and an MID 4 applied to a WCDMA. The MID 3 and the MID 4 use special measurement configurations. The measurement object corresponding to the MID 3 has no frequency information; The measurement object corresponding to the MID 4 contains information of multiple frequencies f3 and f4. Both the MID 3 and the MID 4 use a measurement reporting configuration of the reported the strongest cell, and the number of the reported cells is configured to be 1.

The UE initializes parameters of the MID 1 and the MID 2 according to the information in the measurement control message, evaluates the measurement result of a neighboring cell according to the initialized parameters, and determines all the neighboring cells that meet a trigger condition by evaluation, and generates a measurement report and sends the measurement report to the NB.

As the MID 3 and the MID 4 use special measurement configurations (the existing MID must contain information of one frequency, but this example is special in containing no frequency information or information of multiple frequencies), the UE adopts the following special processing: the UE generates a measurement report for the MID 3 and sends the measurement report to the NB only when the UE determines that the CSG cell in the LTE is accessible and is the cell with the strongest signal quality on the frequency of the CSG cell; the UE generates a measurement report for the MID 4 and sends the measurement report to the UE only when the UE determines that the CSG cell on a frequency f3 or f4 in the WCDMA is accessible and is the cell with the best signal quality on the frequency of the CSG cell.

At a certain moment of the process, the UE detects a CSG cell (Cell 1) on a frequency 5 in the LTE system, acquires the CSG ID and the access mode (closed mode) of the CSG cell by reading a system message of the CSG cell, and finds that the CSG ID is in the allowed accessible CSG list, and that the CSG cell is of the best signal quality on the frequency f5, then the UE reports a measurement report for the MID 3. The report contains the CGI, PCI, TAC (PLMN is not required to be reported for it is the same as that of the current serving cell) and the frequency information of the CSG cell (Cell 1), and may also contain the CSG ID of the CSG cell and the access mode information, wherein the access mode information contains the access mode (closed mode) of the CSG cell and information of the allowed access means (e.g. accessing as a member) of the UE to the CSG cell, and the report may also contain an RSRQ which is the result of a measurement on the signal quality of the CSG cell.

At a certain moment of the process, the UE detects a CSG cell (Cell 2) on the frequency f3 in a WCDMA system, acquires the CSG ID and the access mode (hybrid mode) of the CSG cell by reading a system message of the CSG cell, and finds that the CSG ID is in the allowed accessible CSG list and that the signal quality of the CSG cell is the best on the frequency f3, then the UE reports a measurement report for the MID 4, wherein the measurement report contains the CGI, PSC, RAC, LAC (PLMN is not required to be reported for it is the same as that of the current serving cell) and the frequency information of the CSG cell (Cell 2), and may also contain the CSG ID of the CSG cell and the access mode information, wherein the access mode information contains the access mode (hybrid mode) of the CSG cell and information of the allowed access means (e.g. accessing as a member) of the UE to the CSG cell, and the report may also contain an RSCP, which is the result of a measurement on the signal quality of the CSG cell.

After acquiring the measurement report, the NB determine to perform a handover and makes the UE hand over to the CSG cell (Cell 2) on the frequency f3.

The mentioned above are only preferred embodiments of the present invention and are not used for limiting the present invention. For those skilled in the art, the present invention may have various variations and modifications. It should be understood that all the modifications, equivalent substitutions and improvements made without departing from the spirit and principle of the present invention, shall be included in the protection scope of the present invention.

Industrial Applicability

Compared with the existing technology, the present invention solves the problem about the measurement and reporting of a CSG cell by a UE, so that a network is able to make a decision in time according to a measurement report, satisfying the requirement of the UE on mobility.

The invention claimed is:
1. A measurement reporting method for a Closed Subscriber Group (CSG) cell, comprising:
after establishing a connection with a network in a cell, a User Equipment (UE) in the connected state initiatively detecting a neighboring accessible CSG cell that is not on a frequency in a measurement configuration, then requesting the network for another measurement configuration containing the frequency of the accessible CSG cell by reporting indication information, wherein the indication information contains frequency information of the accessible CSG cell and/or bandwidth information of the accessible CSG cell.
2. The measurement reporting method according to claim 1, wherein
the accessible CSG cell refers to a CSG cell, which belongs to a Home NodeB (NB) with an access mode of a closed or hybrid mode and is in a CSG list of the UE.

3. The measurement reporting method according to claim 1, wherein
the accessible CSG cell refers to a CSG cell, which belongs to a Home NB with an access mode of a hybrid mode and is not in a CSG list of the UE.

4. The measurement reporting method according to claim 1, further comprising:
the network, after receiving the indication information, sending the UE a measurement configuration containing the frequency of the accessible CSG cell, and the UE, after receiving the measurement configuration, performing measurement and/or reporting a measurement report according to the measurement configuration.

5. The measurement reporting method according to claim 4, wherein
the measurement configuration containing the frequency of the accessible CSG cell contains a measurement gap.

6. The measurement reporting method according to claim 4, wherein
the measurement configuration containing the frequency of the accessible CSG cell refers to a measurement configuration in which a measurement identity is correspondingly arranged with an identity dedicated to the accessible CSG cell; or
the measurement configuration containing the frequency of the accessible CSG cell refers to a measurement configuration dedicated to the accessible CSG cell, a measurement object corresponding to a measurement identity of the dedicated measurement configuration has no frequency information or information of multiple frequencies.

7. The measurement reporting method according to claim 4, wherein
the measurement report contains identity information which is needed by the network to uniquely determine the accessible CSG cell; or
the measurement report contains identity information which is needed by the network to uniquely determine the accessible CSG cell and a result of a measurement on the signal quality of the accessible CSG cell; or
the measurement report contains identity information which is needed by the network to uniquely determine the accessible CSG cell and a result of a measurement on the signal quality of the accessible CSG cell, and one or more pieces of the following information: CSG Identity (ID) of the accessible CSG cell, bandwidth information of the accessible CSG cell, access mode of the Home NB to which the accessible CSG cell belongs, and indication information indicating that the UE accesses the CSG cell as a member or as a non-member.

8. The measurement reporting method according to claim 7, wherein
when the accessible CSG cell belongs to an evolved Long Term Evolution (LTE) system, the identity information which enable the network to uniquely determine the accessible CSG cell is: a physical layer identity and a cell global identifier; or a physical layer identity, a cell global identifier and a tracking area code; or a physical layer identity, a cell global identifier, a tracking area code and a public land mobile network identity; or
when the accessible CSG cell belongs to a Universal Terrestrial Radio Access Network (UTRAN) system, the identity information which enable the network to uniquely determine the accessible CSG cell is: a primary scrambling code and a cell global identifier; or a primary scrambling code, a cell global identifier and a location area code; or a primary scrambling code, a cell global identifier and a routing area code; or a primary scrambling code, a cell global identifier, a location area code and a routing area code; or a primary scrambling code, a cell global identifier, a location area code, a routing area code and a public land mobile network identity.

9. The measurement reporting method according to claim 1, wherein
in the step of detecting a neighboring accessible CSG cell that is not on a frequency in a measurement configuration, the UE detects the accessible CSG cell from a system message of the CSG cell or information of the CSG cell stored by the UE.

10. The measurement reporting method according to claim 1, wherein
the frequency information of the accessible CSG cell contains information of one or multiple frequencies.

11. A User Equipment (UE) capable of realizing measurement reporting for a Closed Subscriber Group (CSG) cell, configured to:
initiatively detect, when it is in a connected state, a neighboring accessible CSG cell that is not on a frequency in a measurement configuration, then request a network for another measurement configuration containing the frequency of the accessible CSG cell by reporting indication information, and perform measurement and/or report a measurement report according to the measurement configuration after receiving the measurement configuration which is sent by the network and contains the frequency of the accessible CSG cell;
wherein the connected state indicates that the UE has established a connection with the network in a cell.

12. The UE according to claim 11, wherein
the accessible CSG cell refers to a CSG cell, which belongs to a Home NB with an access mode of a closed or hybrid mode and is in a CSG list of the UE.

13. The UE according to claim 11, wherein
the accessible CSG cell refers to a CSG cell, which belongs to a Home NB with an access mode of a hybrid mode and is not in a CSG list of the UE.

14. The UE according to claim 11, wherein
the UE is configured to detect the accessible CSG cell from a system message of the CSG cell or information of the CSG cell stored by the UE.

15. The UE according to claim 11, wherein
the indication information contains information of one or multiple frequencies of the accessible CSG cell.

16. The UE according to claim 11, wherein
the measurement configuration which is sent by the network and contains the frequency of the accessible CSG cell contains a measurement gap.

* * * * *